(12) United States Patent
Souques et al.

(10) Patent No.: US 10,591,343 B2
(45) Date of Patent: Mar. 17, 2020

(54) FLUID GAUGING SYSTEM AND FUEL TANK EQUIPMENT

(71) Applicant: Zodiac Aerotechnics, Plaisir (FR)

(72) Inventors: Stéphane Souques, Abondant (FR); Daniel Lamourette, Grandchamp (FR)

(73) Assignee: Zodiac Aerotechnics, Plaisir (FR)

( * ) Notice: Subject to any disclaimer, the term of this patent is extended or adjusted under 35 U.S.C. 154(b) by 21 days.

(21) Appl. No.: 15/756,597

(22) PCT Filed: Sep. 23, 2015

(86) PCT No.: PCT/IB2015/002607
§ 371 (c)(1),
(2) Date: Mar. 1, 2018

(87) PCT Pub. No.: WO2017/051210
PCT Pub. Date: Mar. 30, 2017

(65) Prior Publication Data
US 2018/0188098 A1    Jul. 5, 2018

(51) Int. Cl.
*G01F 23/26*  (2006.01)
*G01F 23/00*  (2006.01)
(Continued)

(52) U.S. Cl.
CPC ........... *G01F 23/268* (2013.01); *B64D 37/00* (2013.01); *B64D 37/04* (2013.01);
(Continued)

(58) Field of Classification Search
CPC .......... B64D 37/00; B64D 37/04; G01G 1/00; G01G 17/04; G01G 19/08; G01F 23/14;
(Continued)

(56) References Cited

U.S. PATENT DOCUMENTS 4,553,216 A * 11/1985 Stevens .................. G01F 23/18
702/55
5,513,527 A     5/1996 Griffiths
(Continued)

FOREIGN PATENT DOCUMENTS

EP        0289303        11/1988

OTHER PUBLICATIONS

International Patent Application No. PCT/IB2015/002607, International Search Report and Written Opinion, dated Jun. 30, 2016.

*Primary Examiner* — Brandi N Hopkins
(74) *Attorney, Agent, or Firm* — Kilpatrick Townsend & Stockton LLP; Dean W. Russell

(57) ABSTRACT

A fluid gauging system includes a set of fuel level probes and two computation modules adapted for inferring fluid level information based on measurement signals which originate from the probes. In a refuelling operation mode, the probes are distributed into two dynamically configurable subsets, which are separate and assigned respectively to the computation modules for deriving two results for the fluid level independently from each other. Such system has special interests for fuel tank equipment designed for aircraft. A major advantage is a reduction in the total number of fuel level probes which are necessary to obtain reliable results whatever the fuel level and the aircraft attitude and acceleration.

12 Claims, 4 Drawing Sheets

(51) Int. Cl.
*B64D 37/00* (2006.01)
*B64D 37/04* (2006.01)
*B64D 37/06* (2006.01)

(52) U.S. Cl.
CPC ...... *G01F 23/0069* (2013.01); *G01F 23/0076* (2013.01); *B64D 37/06* (2013.01); *Y02T 50/44* (2013.01)

(58) Field of Classification Search
CPC ...... G01F 23/22; G01F 23/18; G01F 23/0076; G01D 21/02
See application file for complete search history.

(56) References Cited

U.S. PATENT DOCUMENTS

| | | | | |
|---|---|---|---|---|
| 6,157,894 A | * | 12/2000 | Hess | B64D 37/00 702/141 |
| 6,502,042 B1 | * | 12/2002 | Eid | G01F 23/0069 702/50 |
| 7,843,355 B2 | | 11/2010 | Davis | |
| 2003/0041660 A1 | * | 3/2003 | Atkinson | G01F 23/0076 73/149 |
| 2003/0061876 A1 | * | 4/2003 | Atkinson | G01F 23/2962 73/290 V |
| 2006/0220890 A1 | * | 10/2006 | Davis | B64D 37/00 340/612 |
| 2018/0299314 A1 | * | 10/2018 | Zakrzewski | G01F 23/14 |

\* cited by examiner

FLUID GAUGING SYSTEM AND FUEL TANK EQUIPMENT

The invention relates to a fluid gauging system and a fuel tank equipment, suitable in particular for aircraft.

BACKGROUND OF THE INVENTION

Fuel tanks for aircraft may have special shapes which make it difficult or impossible to measure the fuel level inside each fuel tank using a single probe. This applies in particular for fuel tanks which are situated in the wings of an aircraft. In addition the aircraft may vary in incline—also called attitude of the aircraft—and acceleration, so that a fuel level measurement result which is issued by one probe at a fixed location within the tank corresponds to varying fuel quantities depending on the aircraft attitude and acceleration. Because of these reasons, several probes are commonly implemented within an aircraft fuel tank.

Furthermore, it is commonly requested for aircraft design to provide two measurement chains which are independent from each other for measuring the fuel level which exists in an aircraft fuel tank during refuelling.

Combining such request with the issue of measuring the fuel level within a tank of complex shape leads to providing each fuel tank of an aircraft with a significant number of probes, typically between fifteen and eighty probes. This increases the resulting cost of the fuel gauging system, and also its weight. However, total weight is an important issue for aircraft since it increases the fuel consumption.

In addition, arranging probes with suitable connections is more difficult when the fuel tank and/or the aircraft wing are out of composite materials. This increases also the interest of reducing the probe number.

For example, U.S. Pat. No. 7,843,355 discloses a fluid gauging system for equipping one fuel tank, which comprises two separate subsets of probes distributed within the tank, and two separate processors. In refuelling operation mode, each probe subset is assigned to one of the processors, separately from the other probe subset and the other processor, so that each processor can infer fuel level information from the measurement signals which are issued by the probes of the corresponding subset. Thus, two results for the fuel level can be obtained independently and in parallel.

But such structure for a fluid gauging system is not optimized for an aircraft fuel tank although it meets the request for two measurement chains and can be adapted to any shape of the fuel tank.

Starting from this situation, one object of the present invention consists in providing a novel design for a fluid gauging system, which also meets the requirement for two measurement chains and can suit any shape for the fuel tank, but with less probes necessary.

Another object of the invention consists in providing a novel structure for a fluid gauging system, which allows savings in total weight.

SUMMARY OF THE INVENTION

For meeting at least one of these objects or others, a first aspect of the present invention proposes a fluid gauging system which comprises:
- a set of probes each suitable for issuing a measurement signal indicative of a liquid level existing at this probe when the probe set is installed within a fluid tank, and when the liquid level is within a sensing range of the probe; and
- at least two computation modules, each computation module being connected for receiving the measurement signals from those of the probes which pertain to a probe subset dedicated to this computation module, separately from another probe subset which is dedicated to the other computation module, and each computation module being adapted for inferring a fluid level information based on an information about an attitude and acceleration of the fluid tank, and on at least one measurement signal which originates from the probes of the subset which is dedicated to this computation module.

The fluid gauging system of the invention further comprises:
- a dynamically configurable connection set, which is adapted for transmitting the measurement signal which originates from any one of the probes to any one of the computation modules; and
- at least two control modules arranged to control the connection sets, in at least one first operation mode of the fluid gauging system, for assigning one variable subset of the probes to each computation module, depending on the information about the attitude and acceleration of the fluid tank, and depending on information from at least some of the probes indicating whether the liquid level existing at each probe is within the sensing range of said probe or not, so that each variable subset of probes which is assigned to one of the computation modules is separate from the other variable subset assigned to the other computation module, and contains at least one of the probes with the liquid level existing at this probe being within its sensing range.

Thus, in the first operation mode, each computation module uses the measurement signals only from the probes which pertain to the subset currently assigned to this computation module. Thus, both computation modules infer respective fluid level information independently from each other and in parallel.

Each probe subset which is assigned to one of the computation modules may contain several probes but also possibly one single probe, as this subset is determined by the corresponding control module.

Thus thanks to the invention, the probe subset which is assigned to a same one of the computation modules can vary in time, when at least one among the liquid level in the fluid tank, the attitude and the acceleration of the fuel tank changes.

Thanks to implementing the dynamically configurable connection set, both probe subsets can be determined in an optimized manner based on the tank attitude and acceleration and based on the probes which are actually operating within their respective sensing ranges. Thus, the variable optimization of the probe subsets allows reducing the total probe number which is necessary in the tank for obtaining two independent liquid level results whatever the liquid level and the tank attitude. To this purpose, the fluid gauging system may be adapted to store at least one lookup table or to run at least one a program respectively for each control module, this lookup table or program being suitable for selecting the variable subset of probes which is assigned to one of the computation modules in the first operation mode. Such subset selection depends on the information about the attitude and acceleration of the fluid tank, and on the information indicating whether the liquid level existing at each probe is within the sensing range of this probe or not. These information elements may form entries of the lookup table or program.

In possible invention embodiments, the control modules may be adapted to determine the variable subsets of the probes so that when N of the probes are in a situation where the liquid level existing at each of these N probes is within the sensing range of the probe, N being an integer higher than unity, then one of the N probes is selected by at least one of the control modules for forming the variable subset which is assigned to one of the computation modules, called secondary computation module, and all other probes among the N probes are selected by at least the other control module for forming all together the variable subset which is assigned to the other computation module, called primary computation module. Such embodiment combines maximum precision for the result which is inferred by the primary computation module, with result redundancy provided by the secondary computation module.

In preferred implementations of a fluid gauging system according to the invention, the dynamic operation of the connection set may be implemented within processing units. To this purpose, the dynamically configurable connection set may comprise a set of individual Y-connection devices and two dynamically configurable modules. Each Y-connection device is dedicated respectively to one of the probes, and connected for receiving the measurement signal from this probe. It is then adapted for transmitting this measurement signal to both dynamically configurable modules. In addition, each dynamically configurable module, one of the control modules and one of the computation modules may be parts of one processing unit separately from another processing unit which comprises the other control module, the other dynamically configurable module and the other computation module. Then, within each processing unit, the dynamically configurable module is adapted for receiving the measurement signals from the Y-connection devices, and for transmitting or not transmitting each of these measurement signals to the computation module of the processing unit under control of the control module.

According to an improvement of the invention, the control modules may also be arranged to control the connection set, in at least one second operation mode of the fluid gauging system, for transmitting in parallel to both computation modules the measurement signal which originates from at least a same one of the probes, provided that the liquid level existing at this probe is within its sensing range. Then, each computation module infers respective fluid level information separately from the other computation module, based on at least this measurement signal shared by both computation modules. Such second operation mode allows that each computation module operates from a greater number of probes, thereby producing its fluid level information with improved accuracy and improved failure tolerance. Simultaneously, both computation modules provide redundancy for the use of the measurement signals.

A second aspect of the present invention proposes a fuel tank equipment for a vehicle, ship, aircraft or spacecraft, which comprises at least one fluid tank for containing fuel in liquid phase, and a fluid gauging system in accordance with the first invention aspect. The probes of the fluid gauging system are then installed within the fluid tank.

When the fuel tank equipment is designed for an aircraft and when it can provide the second operation mode as explained above, the first operation mode of the fluid gauging system may be a double-check mode, in particular suitable for refuelling period, and the second operation mode of the fluid gauging system may be a full accuracy mode with improved failure tolerance for all possible attitudes, in particular for in-flight period.

In preferred implementations of the invention, insulation elements and/or suitable devices may be used in the fluid gauging system, for preventing operation failures to propagate in the system and to ensure correct operation although some components of the system may become defective.

In particular, when the connection set comprises a plurality of individual connection devices each suitable for transmitting or not transmitting a measurement signal which originates from one of the probes to at least one of the computation modules, then each connection device may be provided with at least one signal insulation element which is arranged at a signal output of this connection device. Thanks to such signal insulation elements, if a defect occurs within one of the connection devices, each computation module can still operate based on the measurement signals which are transmitted by at least another one of the connection devices remaining operative.

In addition, each connection device may be provided with a supply insulation element, this latter being arranged at a power input of the connection device so that if a defect occurs within one individual connection device, the other connection devices can still be power-supplied.

Also for redundancy and safety reasons, the fluid gauging system may further comprise:
  two power supply units which are each capable to supply electrical power to the connection set and also possibly to any one of the probes; and
  a supply device which is connected for transferring electrical power from any one of the power supply units to the connection set, so that the connection set can be power-supplied during separate operation periods either by a single one of the power supply units at one time or by both power supply units simultaneously.

Thus, for operation of the fluid gauging system, only one of the power supply units may supply the power necessary for transmitting the measurement signals to the computation modules, or both power supply units in parallel, depending on the instant electrical power which is available from each power supply unit, or depending on the features of both power supply units.

These and other features of the invention will be now described with reference to the appended figures, which relate to preferred but not-limiting embodiments of the invention.

BRIEF DESCRIPTION OF THE DRAWINGS

For clarity sake, element sizes which appear in these figures do not correspond to actual dimensions or dimension ratios. Also, same reference numbers which are indicated in different ones of these figures denote identical elements or elements with identical function.

DETAILED DESCRIPTION OF THE INVENTION

Figure 1:
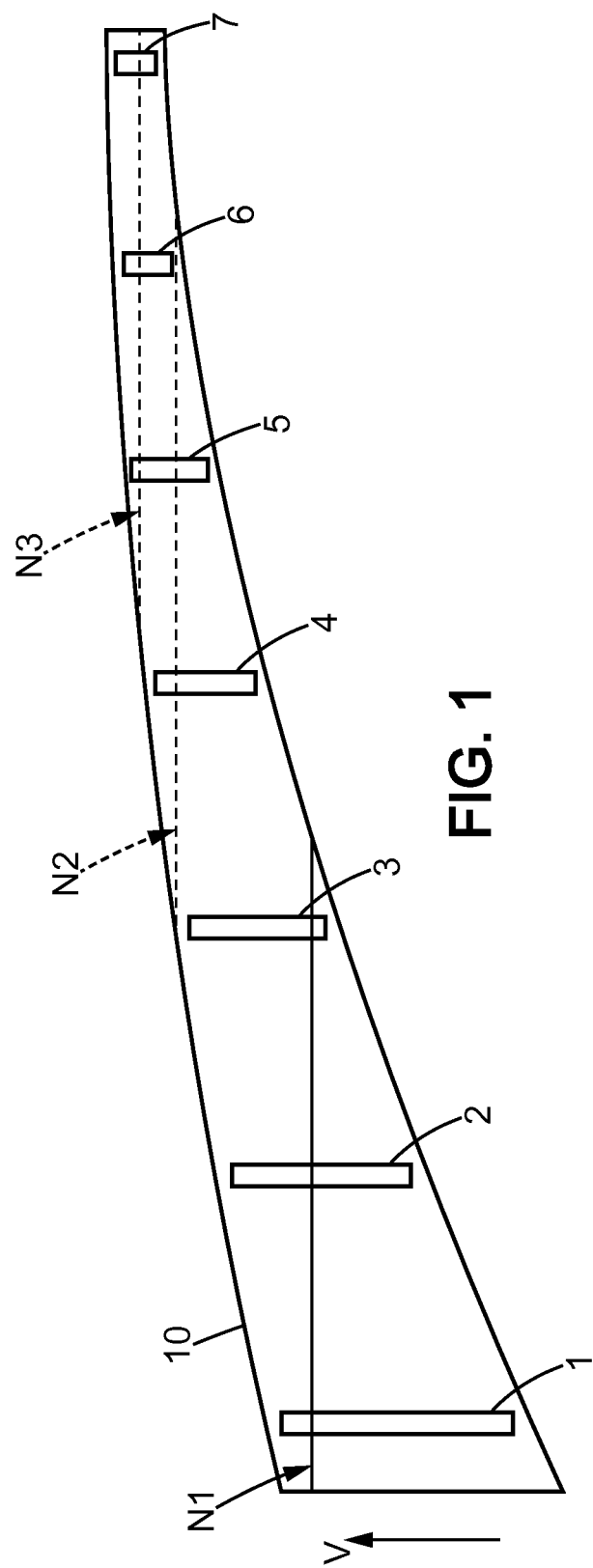
FIG. 1 is a cross-sectional view of an aircraft fuel tank.

For illustrative purpose but not limiting, the invention is now described when applied to an aircraft, for example for passenger air transportation. The reference numbers used in FIGS. 1 and 2 and now listed have the following meanings:

| | |
|---|---|
| 10 | fluid tank, for example a fuel tank to be contained in an aircraft wing |
| N1, N2, N3 | three fuel levels possible to exist within the fuel tank |
| V | vertical direction |
| 1-7 | probes for sensing the fuel level inside the fuel tank |
| 11A, 11B | first and second connection subsets, respectively |
| 110A | connection devices of the first connection subset |
| 110B | connection devices of the second connection subset |
| 111A | signal insulation element for each connection device of the first connection subset |
| 111B | signal insulation element for each connection device of the second connection subset |
| 112A | supply insulation element for each connection device of the first connection subset |
| 112B | supply insulation element for each connection device of the second connection subset |
| 20A, 20B | first and second processing units, denoted CPU_A and CPU_B respectively |
| 21A, 21B | first and second registers, labelled A and B respectively |
| 22A, 22B | first and second control modules, denoted CTRL_A and CTRL_B respectively |
| 23A, 23B | first and second computation modules, denoted COMPT_A and COMPT_B respectively |
| 12 | information display system, comprising a cockpit display and an external display |
| 13 | pitch, roll and acceleration sensing system of the aircraft |
| 14A, 14B | first and second power supply units, labelled A and B respectively |
| 15 | supply device |

In practical implementations of the invention, the register 21A, the control module 22A and the computation module 23A may all be parts of the processing unit 20A. Similar arrangement may be used for the register 21B, the control module 22B and the computation module 23B within the other processing unit 20B.

The fuel tank 10 may be of any general shape, depending on its integration in the aircraft. The tank shape represented corresponds to integration within an aircraft wing. Then, the tank 10 may be thinner and higher with respect to the vertical direction V at the outer wing tank side (on right side of FIG. 1) than at the opposed inner wing tank side (left side of FIG. 1). Fuel is in liquid phase within the tank 10.

The probes 1 to 7 are fixed within the tank 10 at respective locations. Each of them may be of any type, suitable for measuring independently from the others the instant fuel level as existing at the location of this probe. For example, each probe may comprise an electrical capacitor of cylindrical design. Then, each fuel level measurement which is issued by any one of the probes is inferred from a capacitor value of this probe, which varies as a function of the fuel level. Such probe type and its operation is well known in the art so that it is not necessary to explain it again.

The operation of each probe is limited to a sensing range for the fuel level. Such sensing range may result from the probe type itself, in particular from the probe length, and also from the general shape of the fuel tank 10. In the example shown in FIG. 1, the probes 1 to 3 are effective for measuring the fuel level when this latter is near that labelled N1. But these probes 1 to 3 are no longer efficient for a fuel level near that labelled N2, but the probes 4 and 5 are. In the same manner, the probes 5 to 7 are effective for measuring the fuel level when close to N3. Obviously, the respective sensing ranges of the probes also depend on the attitude of the aircraft, namely possible non-zero pitch and/or roll values, and also depend on the acceleration of the aircraft, because the incline and shape of the liquid surface in the tank 10 vary as functions of the instant values of these parameters.

The probe number may be any, and each probe transmits measurement signals simultaneously to both control modules 22A and 22B. The aircraft attitude and acceleration are measured by the pitch, roll and acceleration sensing system 13. Preferably, two data sets each comprising pitch, roll and acceleration values may be obtained in parallel from different sources such as separate measurement units, and each data set is transmitted to one of the control modules 22A, 22B, while the other data set is transmitted independently to the other control module. Based on the pitch, roll and acceleration values and on the measurement signals received from the probes, each control module 22A, 22B determines and selects those among all the probes which are currently operating within their respective sensing ranges. The other probes are deemed not to be useful at this time. Possibly, the measurement signals which are produced by the probes for which the fuel level is out of their sensing ranges may indicate themselves that these probes are out-of-range, for example using prescribed maximum and minimum signal values.

For providing redundancy in the determination of the fuel level, the aircraft is equipped with two parallel channels each able to determine the fuel level independently from the other one. These channels are denoted CHANNEL_A and CHANNEL_B on FIG. 2. CHANNEL_A may comprise the first connection subset 11A, the control module 22A, the computation module 23A, the register 21A, and possibly a first source for the pitch, roll and acceleration data set. Similarly, CHANNEL_B may comprise the second connection subset 11B, the control module 22B, the computation module 23B, the register 21B, and possibly a second source for the pitch, roll and acceleration data set. The connection devices 110A and 110B, pertaining respectively to the connection subset 11A and 11B, form all together the connection set described in the general part of this description.

According to the invention, each one of the probes is not assigned permanently to one of the channels CHANNEL_A and CHANNEL_B, but the probe distribution between both channels varies between separate time periods, depending in particular on the actual fuel level and the aircraft pitch, roll and acceleration. Such distribution is determined by the control modules 22A and 22B and implemented by appropriate commands which are issued by these control modules 22A and 22B and transmitted to the connection devices 110A and 110B.

Figure 2:
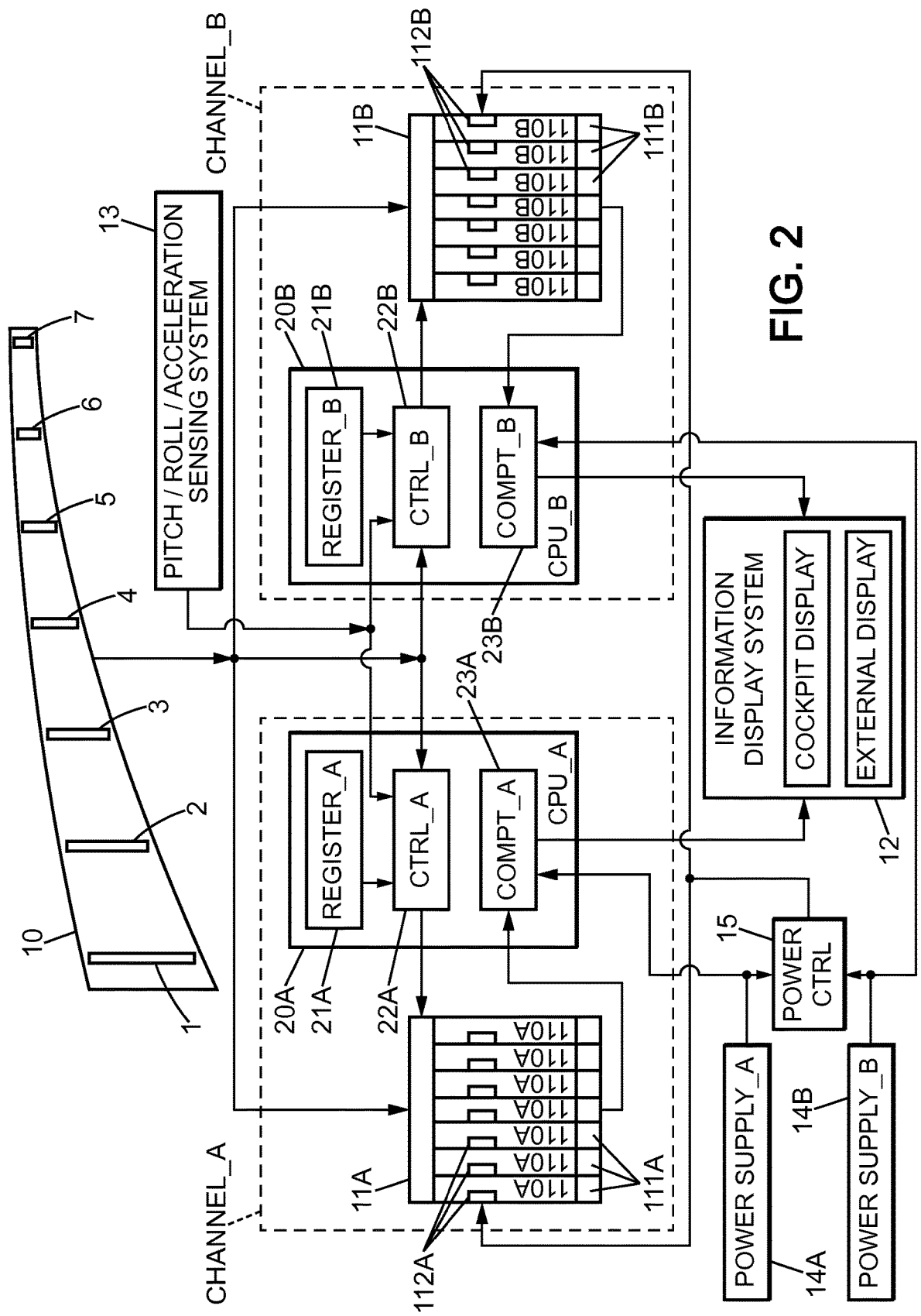
FIG. 2 is a block diagram of a fluid gauging system in accordance with the invention.

In a first possible embodiment of the invention corresponding to FIG. 2, each connection device 110A within the first connection subset 11A is a two-state device capable either to transmit a measurement signal which is received at a signal input of this connection device, to the computation module 23A, or not to transmit any signal. A separate connection device 110A is provided independently for each one of the probes 1-7. Each connection device 110B in the second connection subset 11B is also individually dedicated to transmitting the measurement signal from one of the probes 1-7, assigned to this connection device, to the computation module 23B. The connection subsets 11A and 11B may have similar structure, and a separate connection device 110A, 110B is dedicated to each one of the probes within each subset 11A and 11B. In this manner, the measurement signals which are issued by any one of the probes 1-7 may be forwarded to any one of the computation modules 23A and 23B or both, depending on the commands issued by the control modules 22A and 22B to all the connection devices 110A and 110B. Generally, those of the connection devices 110A and 110B which are dedicated to probes currently out-of-range, may be controlled to be in not-transmission state.

Then, in a first operation mode controlled by the modules 22A and 22B and corresponding to the refuelling operation mode, the probes with the fuel level within their respective sensing ranges are distributed into two separate subsets. The first probe subset is assigned to CHANNEL_A by the control module 22A, by controlling those of the connection devices 110A which are dedicated to these probes to be in signal-transmission state. Simultaneously, those of the connection devices 110A which do not correspond to probes of the first probe subset are controlled to be in not-transmission state. The second probe subset is assigned to CHANNEL_B by the control module 22B, by controlling those of the connection devices 110B which are dedicated to these other probes to be in signal-transmission state. Also, those of the connection devices 110B which do not correspond to probes pertaining to the second probe subset are controlled to be in not-transmission state. In this way, the fuel level can be determined independently by CHANNEL_A using the first probe subset on one hand, and by CHANNEL_B using the second probe subset on another hand. The control modules 22A and 22B determine the first and second probe subsets, respectively, based at least on one of the measurement signals issued by the probes currently operating within their sensing ranges and the pitch, roll and acceleration values. This may be achieved by the control module 22A using the lookup table which is stored in the register 21A, and with the measurement signals and the pitch, roll and acceleration values as entries of this lookup table. A program may be used alternatively to the lookup table for the same purpose. For the control module 22A to determine the probe subset, the measurement signals may be used only for indicating whether each probe is actually effective or whether it is out-of-range. The exact magnitude of the measurement signals are used thereafter by each computation module for inferring its result for the fuel level, also called fuel level information. Similar operation is achieved by the control module 22B using the lookup table stored in the register 21B, for determining the probe subset which is assigned to CHANNEL_B. For the refuelling operation mode, both lookup tables or equivalent programs are designed for forming probe subsets which are complementary to each other with respect to the probes currently operating within their respective sensing ranges.

For example, when the fuel level is N1 for the fuel tank of FIG. 1, the first probe subset, assigned to the computation module 23A or CHANNEL_A, may be comprised of the probes 2 and 3, and the second subset, assigned to the computation module 23B or CHANNEL_B, may be comprised of the probe 1 alone. When the fuel level is N2, the first probe subset, for CHANNEL_A, may be comprised of the probe 5 only, and the second subset, for CHANNEL_B, may be comprised of the probe 4 only. And when the fuel level is N3, the first probe subset for CHANNEL_A may be comprised of the probes 6 and 7, and the second subset for CHANNEL_B may be comprised of the probe 5 only.

Hence, in this first operation mode, the computation module 23A infers a first result for the fuel level, and the computation module 23B infers a second result for the same fuel level. Each one is computed and transmitted separately to the information display system 12. Thus, each result may be shown either on the external display which is intended to the refuelling operator, or on the cockpit display, or on both the external display and the cockpit display. Under correct overall operation, the first and second results for the fuel level should be consistent although they have been inferred through completely independent probe subsets and processing channels.

In a second operation mode controlled by the modules 22A and 22B and corresponding to in-flight operation mode, the probes with the fuel level within their respective sensing ranges are each assigned simultaneously to both channels CHANNEL_A and CHANNEL_B. In this way, the results for the fuel level as inferred by each one of the computation modules 23A and 23B have maximum precision. These results from both channels are sent independently to the information display system 12.

The processing unit 20A, including the control module 22A and the computation module 23A, is power-supplied by the power supply unit 14A. Similarly, the processing unit 20B, including the control module 22B and the computation module 23B, is power-supplied by the power supply unit 14B. But preferably, all connection devices 110A and 110B may be power-supplied through the supply device 15. Possibly, each probe for measuring the fuel level in the fuel tank 10 may be power-supplied through the connection device which transmits its measurement signals to the computation module(s) involved with it, depending on the operation mode of the system and the probe subsets. The supply device 15 may be designed for transferring to the connection devices 110A and 110B electrical power which originates from any one of the power supply units 14A and 14B, or simultaneously from both power supply units in a combined manner. In particular, when one of the power supply units 14A and 14B exhibits failure, for example its output voltage being too low, then the supply device 15 transfers electrical power which is produced by the one of the power supply units 14A and 14B which is operating correctly, or by both power supply units so as to reach the amount of electrical power which is necessary for the connection devices. In this way, the transmission of the measurement signals is not altered whatever the operation mode.

The improvements now described are dedicated to ensuring operation safety if one of the connection devices 110A or 110B has become defective. It is intended to allow the fluid gauging system to operate again whatever the operation mode, but based only on the other connection devices which are still operating normally.

First, each connection device 110A, 110B may be provided at its power input with a supply insulation element 112A, 112B respectively. This supply insulation element ensures that a failure in any one of the connection devices 110A and 110B, such as a short-circuit failure, does not propagate along the power delivery network of the corresponding channel. The purpose of the supply insulation element 112A, 112B upon occurrence of such failure is to disconnect or insulate electrically the connection device 110A, 110B which is defective from the power delivery network. Such supply insulation element 112A, 112B may be based on a fuse or any electrical disconnection circuitry which is arranged at the power input of each connection device 110A, 110B.

Second, each connection device 110A, 110B may be provided at its signal output with a signal insulation element 111A, 111B respectively. This signal insulation element ensures that a failure in any one of the connection devices 110A and 110B does not propagate to the computation module 23A, 23B of the corresponding channel. The purpose of the signal insulation element 111A, 111B upon occurrence of such failure is to insulate the connection device 110A, 110B which is defective from the computation module 23A or 23B depending on the channel. Such signal insulation element 111A, 111B may be based on resistors or any electronic circuitry which is arranged at the signal output of each connection device 110A, 110B.

Figure 3:
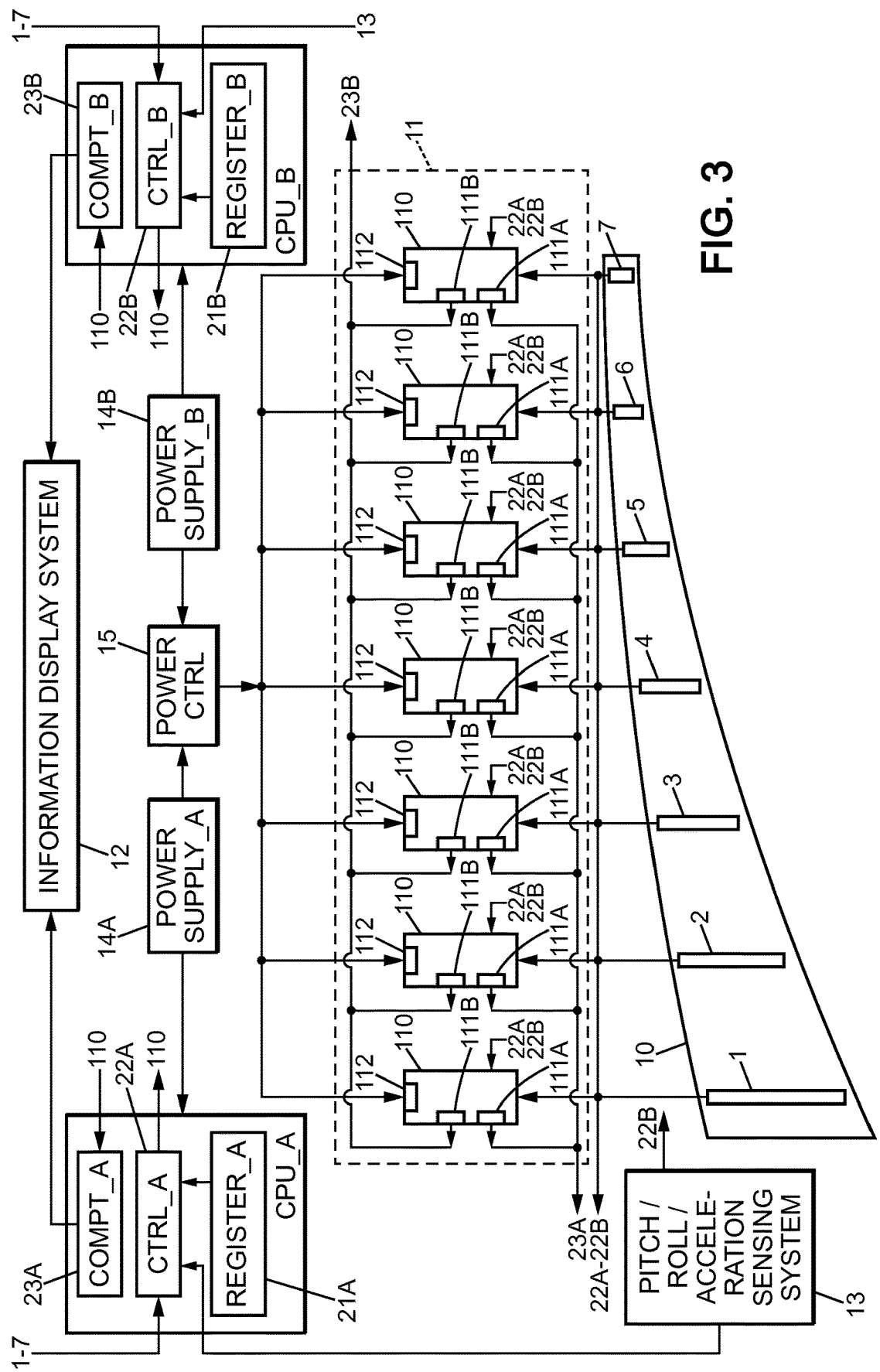
FIG. 3 is an alternative layout for a fluid gauging system in accordance with the invention.

FIG. 3 illustrates an alternative possible embodiment for a fluid gauging system also in accordance with the invention, but with a different component arrangement. Mainly, both connection devices 110A and 110B which were dedicated in FIG. 2 to a same one of the fuel level probes 1-7 but connected separately and respectively to the computation modules 23A and 23B, are merged into a single connection device of dual-connection type, called dual-connection device. Thus, one separate dual-connection device 110 is provided for each probe. All the dual-connection devices 110 then form a single connection set denoted 11. The control modules 22A and 22B control each of the dual-connection devices 110 so that the measurement signals which are issued by the corresponding probe are transmitted to the computation module 23A only, or 23B only, or both, depending on the operation mode. The first and second operation modes as described before with reference to FIGS. 1 and 2 apply again, in particular with respect to the probe subsets assigned to each computation module 23A, 23B for the first operation mode.

The power input of each dual-connection device 110 may also be provided with a supply insulation element, now referenced 112, and both signal outputs of this dual-connection device 110, connected respectively to the computation modules 23A and 23B, may be provided with signal insulation elements 111A and 111B.

Figure 4:
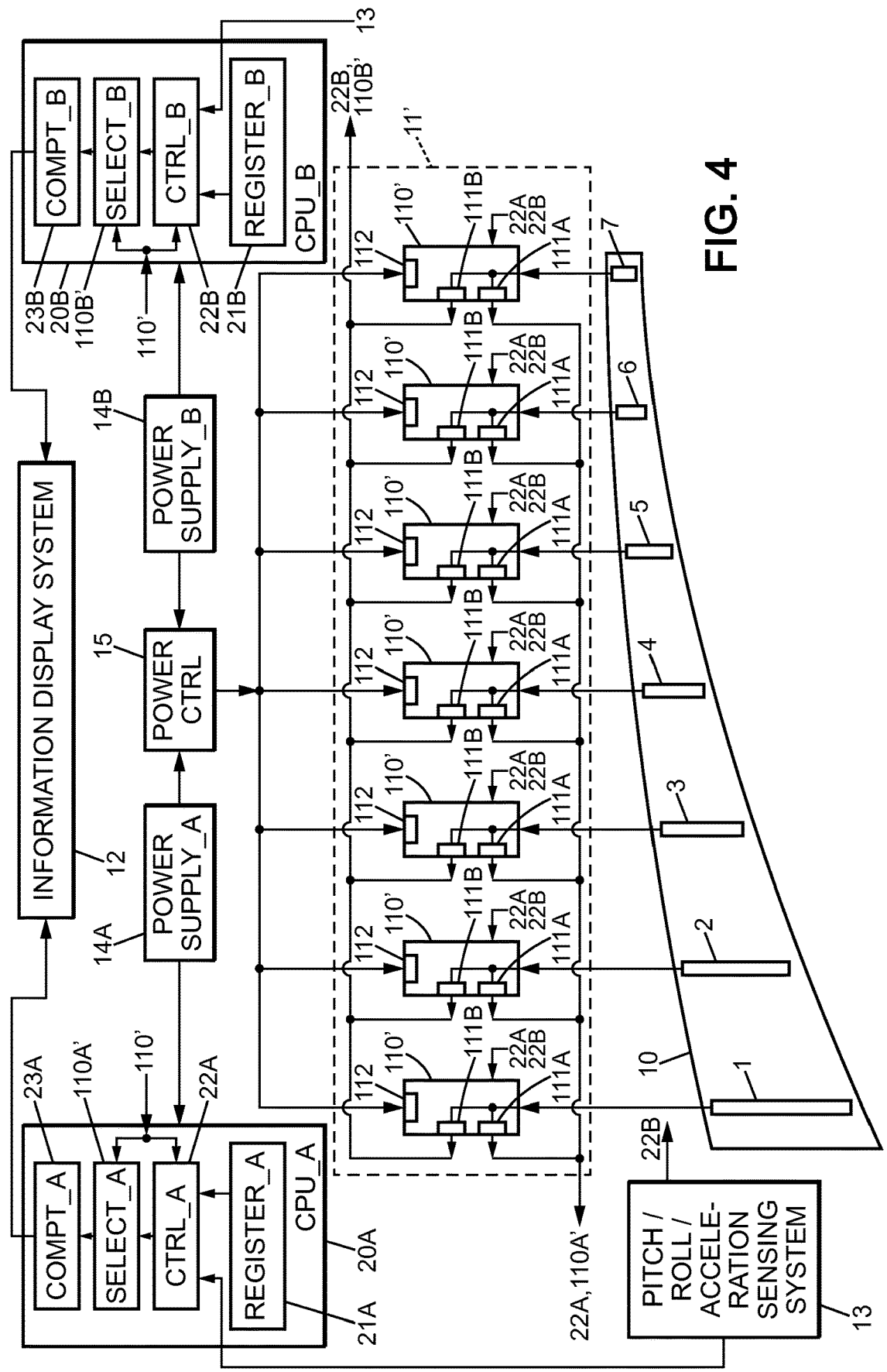
FIG. 4 corresponds to FIG. 2 or 3 for a preferred embodiment of the invention.

FIG. 4 illustrates another embodiment of a fluid gauging system still in accordance with the invention, in which the variable transmission of the measurement signals which are issued by the probes 1-7 is implemented within the processing units 20A and 20B. Starting from the embodiment of FIG. 3, each dual-connection device 110 is replaced by an Y-connection device 110' having one signal input and two signal outputs. Each Y-connection device 110' is connected at input to one of the probes 1-7 for receiving the measurement signals only from this probe. Both signal outputs of each Y-connection device 110' are connected respectively to the processing units 20A and 20B. Each Y-connection device 110' is passive, so that it transmits each measurement signal simultaneously to both processing units 20A and 20B. All Y-connection devices 110' form a connection set which is labelled 11' in FIG. 4. They may also be provided with the signal insulation elements 111A, 111B and the supply insulation elements 112.

In the embodiment of FIG. 4, each processing unit 20A (resp. 20B) further contains a dynamically configurable module 110A' (resp. 110B') which is functionally intermediate between the control module 22A (resp. 22B) and the computation module 23A (resp. 23B). The dynamically configurable modules 110A' and 110B' are noted SELECT_A and SELECT_B in FIG. 4 and may be of software-type. They each receive all the measurement signals from the probes 1-7 and transmit each a selection of these measurement signals under control of the control modules 22A and 22B. The operation of the control modules 22A, 22B and the computation modules 23A, 23B may be identical to those of the embodiment of FIG. 3, but the actual implementation of the probe selection as decided by the control modules 22A, 22B is now produced by the dynamically configurable modules 110A', 110B' within the processing units 20A, 20B.

Anyone will understand that the invention can be reproduced while changing secondary aspects but maintaining its main advantages. Mainly, in the refuelling operation mode, the invention provides dynamically configurable subsets of probes, suitable for inferring two results for the fuel level independently from each other. A major advantage is a reduction in the total number of fuel level probes which are necessary to obtain the two independent results whatever the fuel level and the aircraft pitch, roll and acceleration. Typically, the invention may allow reducing the probe number of about 15%, while providing same fuel level information with identical accuracy and independency for one same fuel tank.

The invention claimed is:

1. Fluid gauging system comprising:
    a set of probes each suitable for issuing a measurement signal indicative of a liquid level existing at said probe when the probe set is installed within a fluid tank, and when the liquid level is within a sensing range of the probe; and
    at least two computation modules, each computation module being connected for receiving the measurement signals from those of the probes which pertain to a probe subset dedicated to said computation module, separately from another probe subset which is dedicated to the other computation module, and each computation module being adapted for inferring a fluid level information based on an information about an attitude and acceleration of the fluid tank, and on at least one measurement signal which originates from the probes of the subset which is dedicated to said computation module,
wherein the fluid gauging system further comprises:
    a dynamically configurable connection set adapted for transmitting the measurement signal which originates from any one of the probes to any one of the computation modules; and
    at least two control modules arranged to control the connection set, in at least one first operation mode of the fluid gauging system, for assigning one variable subset of the probes to each computation module, depending on the information about the attitude and acceleration of the fluid tank, and depending on information from at least some of the probes indicating whether the liquid level existing at each probe is within the sensing range of said probe or not, so that each variable subset of probes assigned to one of the computation modules is separate from the other variable subset assigned to the other computation module, and contains at least one of the probes with the liquid level existing at said probe being within the sensing range of said probe,
so that in the first operation mode, each computation module receives measurement signals only from the probes which pertain to the variable subset of probes assigned to said computation module, and so that both computation modules infer respective fluid level information independently and in parallel.

2. Fluid gauging system according to claim 1, wherein the connection set comprises a plurality of individual connection devices each suitable for transmitting or not transmitting the measurement signal which originates from one of the probes to at least one of the computation modules, and each connection device is provided with at least one signal insulation element arranged at a signal output of said connection device, so that if a defect occurs within one of the connection devices, each computation module can still operate based at least on the measurement signals which are transmitted by at least another one of the connection devices remaining operative.

3. Fuel gauging system according to claim 2, further comprising:
two power supply units each capable to supply electrical power to the connection set and also to any one of the probes; and
a supply device connected for transferring the electrical power from any one of the power supply units to the connection set, so that said connection set is power-supplied during separate operation periods either by one of the power supply units at one time or by both power supply units simultaneously.

4. Fluid gauging system according to claim 2, wherein each connection device is provided with a supply insulation element arranged at a power input of said connection device, so that if a defect occurs within one of the connection devices, the other connection devices can still be power-supplied.

5. Fuel gauging system according to claim 4, further comprising:
two power supply units each capable to supply electrical power to the connection set and also to any one of the probes; and
a supply device connected for transferring the electrical power from any one of the power supply units to the connection set, so that said connection set is power-supplied during separate operation periods either by one of the power supply units at one time or by both power supply units simultaneously.

6. Fluid gauging system according to claim 2, further comprising:
two power supply units each capable to supply electrical power to the connection set; and
a supply device connected for transferring the electrical power from any one of the power supply units to the connection set, so that said connection set is power-supplied during separate operation periods either by one of the power supply units at one time or by both power supply units simultaneously.

7. Fluid gauging system according to claim 1, wherein the control modules are adapted to determine the variable subsets of the probes so that when N of the probes are in a situation where the liquid level existing at each of said N probes is within the sensing range of the probe, N being an integer higher than unity, then one of said N probes is selected by at least one of the control modules for forming the variable subset which is assigned to one of the computation modules, called secondary computation module, and all other probes among said N probes are selected by at least the other control module for forming all together the variable subset which is assigned to the other computation module, called primary computation module.

8. Fluid gauging system according to claim 1, adapted to store at least one lookup table or to run at least one program respectively for each control module, said lookup table or program being suitable for selecting the variable subset of probes which is assigned to one of the computation modules in the first operation mode, with the information about the attitude and acceleration of the fluid tank and the information indicating whether the liquid level existing at each probe is within the sensing range of said probe or not forming entries of said lookup tables or programs.

9. Fluid gauging system according to claim 1, wherein the dynamically configurable connection set comprises:
a set of individual Y-connection devices, and
two dynamically configurable modules; and
wherein:
each Y-connection device is dedicated respectively to one of the probes and connected for receiving the measurement signal from said probe, and adapted for transmitting said measurement signal to both dynamically configurable modules;
each dynamically configurable module, one of the control modules and one of the computation modules are parts of one processing unit separately from another processing unit comprising the other control module, the other dynamically configurable module and the other computation module; and
within each processing unit, the dynamically configurable module is adapted for receiving the measurement signals from the Y-connection devices, and for transmitting or not transmitting each of said measurement signals to the computation module of said processing unit under control of the control module of said processing unit.

10. Fluid gauging system according to claim 1, wherein the control modules are also arranged to control the connection set, in at least one second operation mode of the fluid gauging system, for transmitting in parallel to both computation modules the measurement signal which originates from at least a same one of the probes, the liquid level existing at said probe being within the sensing range of said probe, and each computation module infers separately from the other computation module a respective fluid level information based on at least said measurement signal shared by both computation modules.

11. Fuel tank equipment for a vehicle, ship, aircraft or spacecraft, comprising at least:
one fluid tank for containing fuel in liquid phase, and
a fluid gauging system in accordance with claim 1, with the probes of said fluid gauging system installed within the fluid tank.

12. Fuel tank equipment according to claim 11, adapted for equipping an aircraft and wherein the fluid gauging system and the first operation mode of the fluid gauging system is a double-check mode, in particular for refueling period, and the second operation mode of the fluid gauging system is a full accuracy mode with failure tolerance, in particular for in-flight period.

* * * * *